(12) United States Patent
Adams et al.

(10) Patent No.: US 8,856,946 B2
(45) Date of Patent: Oct. 7, 2014

(54) SECURITY FILTER FOR CONTEXT-BASED DATA GRAVITY WELLS

(71) Applicant: International Business Machines Corporation, Armonk, NY (US)

(72) Inventors: Samuel S. Adams, Rutherfordton, NC (US); Robert R. Friedlander, Southbury, CT (US); James R. Kraemer, Santa Fe, NM (US); Jeb R. Linton, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 13/755,623

(22) Filed: Jan. 31, 2013

(65) Prior Publication Data

US 2014/0215633 A1     Jul. 31, 2014

(51) Int. Cl.
    *G06F 21/00*            (2013.01)
    *G06F 21/60*            (2013.01)

(52) U.S. Cl.
    CPC ...................................... *G06F 21/60* (2013.01)
    USPC ...................... 726/26; 726/2; 726/29; 705/44

(58) Field of Classification Search
    USPC ................................ 726/26, 29, 2; 705/44, 76
    See application file for complete search history.

(56) References Cited

U.S. PATENT DOCUMENTS

| | | | |
|---|---|---|---|
| 5,450,535 | A | 9/1995 | North |
| 5,664,179 | A | 9/1997 | Tucker |
| 5,689,620 | A | 11/1997 | Kopec et al. |
| 5,701,460 | A | 12/1997 | Kaplan et al. |

(Continued)

FOREIGN PATENT DOCUMENTS

| | | | |
|---|---|---|---|
| EP | 1566752 | A2 | 8/2005 |
| EP | 1843259 | A2 | 10/2007 |
| WO | 2006086179 | A2 | 8/2006 |
| WO | 2007044763 | A2 | 4/2007 |

OTHER PUBLICATIONS

Sarfraz Alam, Mohammad M. R. Chowdhury, Josef Noll, Interoperability of Security-Enabled Internet of Things, Wireless Personal Communications, Dec. 2011, vol. 61, Issue 3, pp. 567-586.*

(Continued)

*Primary Examiner* — Peter Shaw
*Assistant Examiner* — Ali Shayanfar
(74) *Attorney, Agent, or Firm* — John R. Pivnichny; Law Office of Jim Boice (57) ABSTRACT

A processor-implemented method, system, and/or computer program product defines multiple security-enabled context-based data gravity wells on a security-enabled context-based data gravity wells membrane. Non-contextual data objects are associated with context objects to define synthetic context-based objects. The synthetic context-based objects are associated with one or more security objects to generate security-enabled synthetic context-based objects, which are parsed into an n-tuple that includes a pointer to one of the non-contextual data objects, a probability that a non-contextual data object has been associated with a correct context object, probability that the security object has been associated with a correct synthetic context-based object, and a weighting factor of importance of the security-enabled synthetic context-based object. A virtual mass of each parsed security-enabled synthetic context-based object is calculated, in order to define a shape of multiple security-enabled context-based data gravity wells that are created when security-enabled synthetic context-based objects are pulled in.

20 Claims, 6 Drawing Sheets

(56) References Cited

U.S. PATENT DOCUMENTS

| | | | |
|---|---|---|---|
| 5,974,427 | A | 10/1999 | Reiter |
| 6,199,064 | B1 | 3/2001 | Schindler |
| 6,275,833 | B1 | 8/2001 | Nakamura et al. |
| 6,314,555 | B1 | 11/2001 | Ndumu et al. |
| 6,553,371 | B2 | 4/2003 | Gutierrez-Rivas et al. |
| 6,633,868 | B1 | 10/2003 | Min et al. |
| 6,768,986 | B2 | 7/2004 | Cras et al. |
| 7,058,628 | B1 | 6/2006 | Page |
| 7,337,174 | B1 | 2/2008 | Craig |
| 7,441,264 | B2 | 10/2008 | Himmel et al. |
| 7,523,118 | B2 | 4/2009 | Friedlander et al. |
| 7,523,123 | B2 | 4/2009 | Yang et al. |
| 7,571,163 | B2 | 8/2009 | Trask |
| 7,702,605 | B2 | 4/2010 | Friedlander et al. |
| 7,748,036 | B2 | 6/2010 | Speirs, III et al. |
| 7,752,154 | B2 | 7/2010 | Friedlander et al. |
| 7,778,955 | B2 | 8/2010 | Kuji |
| 7,783,586 | B2 | 8/2010 | Friedlander et al. |
| 7,788,202 | B2 | 8/2010 | Friedlander et al. |
| 7,788,203 | B2 | 8/2010 | Friedlander et al. |
| 7,792,774 | B2 | 9/2010 | Friedlander et al. |
| 7,792,776 | B2 | 9/2010 | Friedlander et al. |
| 7,792,783 | B2 | 9/2010 | Friedlander et al. |
| 7,797,319 | B2 | 9/2010 | Piedmonte |
| 7,805,390 | B2 | 9/2010 | Friedlander et al. |
| 7,805,391 | B2 | 9/2010 | Friedlander et al. |
| 7,809,660 | B2 | 10/2010 | Friedlander et al. |
| 7,853,611 | B2 | 12/2010 | Friedlander et al. |
| 7,870,113 | B2 | 1/2011 | Gruenwald |
| 7,877,682 | B2 | 1/2011 | Aegerter |
| 7,930,262 | B2 | 4/2011 | Friedlander et al. |
| 7,953,686 | B2 | 5/2011 | Friedlander et al. |
| 7,970,759 | B2 | 6/2011 | Friedlander et al. |
| 7,996,393 | B1 | 8/2011 | Nanno et al. |
| 8,046,358 | B2 | 10/2011 | Thattil |
| 8,055,603 | B2 | 11/2011 | Angell et al. |
| 8,069,188 | B2 | 11/2011 | Larson et al. |
| 8,086,614 | B2 | 12/2011 | Novy |
| 8,145,582 | B2 | 3/2012 | Angell et al. |
| 8,150,882 | B2 | 4/2012 | Meek et al. |
| 8,155,382 | B2 | 4/2012 | Rubenstein |
| 8,199,982 | B2 | 6/2012 | Fueyo et al. |
| 8,234,285 | B1 | 7/2012 | Cohen |
| 8,250,581 | B1 | 8/2012 | Blanding |
| 8,341,626 | B1 | 12/2012 | Gardner et al. |
| 8,447,273 | B1 | 5/2013 | Friedlander et al. |
| 8,620,958 | B1 | 12/2013 | Adams et al. |
| 2002/0111792 | A1 | 8/2002 | Cherny |
| 2002/0184401 | A1 | 12/2002 | Kadel et al. |
| 2003/0065626 | A1 | 4/2003 | Allen |
| 2003/0088576 | A1 | 5/2003 | Hattori et al. |
| 2003/0149562 | A1 | 8/2003 | Walther |
| 2004/0111410 | A1 | 6/2004 | Burgoon et al. |
| 2004/0153461 | A1 | 8/2004 | Brown et al. |
| 2004/0162838 | A1 | 8/2004 | Murayama et al. |
| 2004/0249789 | A1 | 12/2004 | Kapoor et al. |
| 2005/0050030 | A1 | 3/2005 | Gudbjartsson et al. |
| 2005/0165866 | A1 | 7/2005 | Bohannon et al. |
| 2005/0273730 | A1 | 12/2005 | Card et al. |
| 2006/0004851 | A1 | 1/2006 | Gold et al. |
| 2006/0036568 | A1 | 2/2006 | Moore et al. |
| 2006/0190195 | A1 | 8/2006 | Watanabe et al. |
| 2006/0197762 | A1 | 9/2006 | Smith et al. |
| 2006/0271586 | A1 | 11/2006 | Federighi et al. |
| 2006/0290697 | A1 | 12/2006 | Madden et al. |
| 2007/0006321 | A1 | 1/2007 | Bantz et al. |
| 2007/0016614 | A1 | 1/2007 | Novy |
| 2007/0073734 | A1 | 3/2007 | Doan et al. |
| 2007/0079356 | A1 | 4/2007 | Grinstein |
| 2007/0136048 | A1 | 6/2007 | Richardson-Bunbury et al. |
| 2007/0185850 | A1 | 8/2007 | Walters et al. |
| 2007/0282916 | A1 | 12/2007 | Albahari et al. |
| 2007/0300077 | A1 | 12/2007 | Mani et al. |
| 2008/0065655 | A1 | 3/2008 | Chakravarthy et al. |
| 2008/0066175 | A1 | 3/2008 | Dillaway et al. |
| 2008/0086442 | A1 | 4/2008 | Dasdan et al. |
| 2008/0091503 | A1 | 4/2008 | Schirmer et al. |
| 2008/0133474 | A1 | 6/2008 | Hsiao et al. |
| 2008/0172715 | A1 | 7/2008 | Geiger et al. |
| 2008/0208813 | A1 | 8/2008 | Friedlander et al. |
| 2008/0208838 | A1 | 8/2008 | Friedlander et al. |
| 2008/0208901 | A1 | 8/2008 | Friedlander et al. |
| 2008/0281801 | A1* | 11/2008 | Larson et al. ............... 707/4 |
| 2008/0306926 | A1 | 12/2008 | Friedlander et al. |
| 2009/0024553 | A1 | 1/2009 | Angell et al. |
| 2009/0064300 | A1 | 3/2009 | Bagepalli et al. |
| 2009/0125546 | A1 | 5/2009 | Iborra et al. |
| 2009/0144609 | A1 | 6/2009 | Liang et al. |
| 2009/0164649 | A1 | 6/2009 | Kawato |
| 2009/0165110 | A1* | 6/2009 | Becker et al. ............... 726/9 |
| 2009/0287676 | A1 | 11/2009 | Dasdan |
| 2009/0299988 | A1 | 12/2009 | Hamilton, II et al. |
| 2009/0327632 | A1 | 12/2009 | Glaizel et al. |
| 2010/0070640 | A1 | 3/2010 | Allen et al. |
| 2010/0088322 | A1 | 4/2010 | Chowdhury et al. |
| 2010/0131293 | A1 | 5/2010 | Linthicum et al. |
| 2010/0179933 | A1 | 7/2010 | Bai et al. |
| 2010/0191747 | A1 | 7/2010 | Ji et al. |
| 2010/0241644 | A1 | 9/2010 | Jackson et al. |
| 2010/0257198 | A1 | 10/2010 | Cohen et al. |
| 2010/0274785 | A1 | 10/2010 | Procopiuc et al. |
| 2011/0040724 | A1 | 2/2011 | Dircz |
| 2011/0066649 | A1 | 3/2011 | Berlyant et al. |
| 2011/0077048 | A1 | 3/2011 | Busch |
| 2011/0087678 | A1 | 4/2011 | Frieden et al. |
| 2011/0123087 | A1 | 5/2011 | Nie et al. |
| 2011/0137882 | A1 | 6/2011 | Weerasinghe |
| 2011/0194744 | A1 | 8/2011 | Wang et al. |
| 2011/0208688 | A1 | 8/2011 | Ivanov et al. |
| 2011/0246483 | A1 | 10/2011 | Darr et al. |
| 2011/0246498 | A1 | 10/2011 | Forster |
| 2011/0282888 | A1* | 11/2011 | Koperski et al. ............... 707/752 |
| 2011/0301967 | A1 | 12/2011 | Friedlander et al. |
| 2011/0314155 | A1 | 12/2011 | Narayanaswamy et al. |
| 2012/0004891 | A1 | 1/2012 | Rameau et al. |
| 2012/0016715 | A1 | 1/2012 | Brown et al. |
| 2012/0023141 | A1 | 1/2012 | Holster |
| 2012/0072468 | A1 | 3/2012 | Anthony et al. |
| 2012/0079493 | A1 | 3/2012 | Friedlander et al. |
| 2012/0110004 | A1 | 5/2012 | Meijer |
| 2012/0131139 | A1* | 5/2012 | Siripurapu et al. ............ 709/217 |
| 2012/0131468 | A1 | 5/2012 | Friedlander et al. |
| 2012/0191704 | A1 | 7/2012 | Jones |
| 2012/0209858 | A1* | 8/2012 | Lamba et al. ............... 707/748 |
| 2012/0221439 | A1 | 8/2012 | Sundaresan et al. |
| 2012/0233194 | A1 | 9/2012 | Ohyu et al. |
| 2012/0239761 | A1 | 9/2012 | Linner et al. |
| 2012/0240080 | A1 | 9/2012 | O'Malley |
| 2012/0246148 | A1 | 9/2012 | Dror |
| 2012/0259841 | A1 | 10/2012 | Hsiao et al. |
| 2012/0278897 | A1 | 11/2012 | Ang et al. |
| 2012/0281830 | A1 | 11/2012 | Stewart et al. |
| 2012/0297278 | A1 | 11/2012 | Gattani et al. |
| 2012/0311587 | A1 | 12/2012 | Li et al. |
| 2012/0316821 | A1 | 12/2012 | Levermore et al. |
| 2012/0330958 | A1 | 12/2012 | Xu et al. |
| 2013/0019084 | A1 | 1/2013 | Orchard et al. |
| 2013/0031302 | A1 | 1/2013 | Byom et al. |
| 2013/0060696 | A1* | 3/2013 | Martin et al. ............... 705/44 |
| 2013/0103389 | A1* | 4/2013 | Gattani et al. ............... 704/9 |
| 2013/0124564 | A1 | 5/2013 | Oztekin et al. |
| 2013/0173292 | A1 | 7/2013 | Friedlander et al. |
| 2013/0173585 | A1 | 7/2013 | Friedlander et al. |
| 2013/0238667 | A1 | 9/2013 | Carvalho et al. |
| 2013/0291098 | A1 | 10/2013 | Chung et al. |
| 2013/0326412 | A1* | 12/2013 | Treiser ............... 715/810 |
| 2014/0012884 | A1 | 1/2014 | Bornea et al. |
| 2014/0025702 | A1 | 1/2014 | Curtiss et al. |
| 2014/0074833 | A1 | 3/2014 | Adams et al. |

(56) References Cited

U.S. PATENT DOCUMENTS

2014/0074885 A1 3/2014 Adams et al.
2014/0074892 A1 3/2014 Adams et al.

OTHER PUBLICATIONS

Faulkner, Paul, "Common Patterns for Synthetic Events in Websphere Business Events," January 15, 2011, http://www.ibm.com/developerworks/websphere/bpmjournal/1101_faulkner2/1101_faulkner2.html, pp. 1-6.
Evaggelio Pitoura et al., "Context in Databases", University of Ioannina, Greece, 2004, pp. 1-19.
Avinash Kaushik, "End of Dumb Tables in Web Analytics Tools! Hello: Weighted Sort", Sep. 7, 2010, www.kaushik.net, pp. 1-15.
Lorenzo Alberton, "Graphs in the Database: SQL Meets Social Networks," Techportal, Sep. 7, 2009, http://techportal.inviqa.com/2009/09/07/graphs-in-the-database-sql-meets-social-networks/, pp. 1-11.
Visual Paradigm, "DB Visual Architect 4.0 Designer's Guide: Chapter 6—Mapping Object Model to Data Model and Vice Versa", 2007, pp. 6-2-6-26.
"Fraud Detection Using Data Analytics in the Banking Industry," ACL Services Ltd., 2010, pp. 1-9 <http://www.acl.com/pdfs/DP_Fraud_detection_BANKING.pdf>.
W. Caid et al., "Context Vector-Based Text Retrieval", Fair Isaac Corporation, Aug. 2003, pp. 1-20.
Samuel S. Adams, et al., U.S. Appl. No. 13/680,832—Specification and Drawings filed Nov. 19, 2012.
Samuel S. Adams, et al., U.S. Appl. No. 13/906,658—Specification and Drawings filed May 31, 2013.
U.S. Appl. No. 13/680,832—Non-Final Office Action Mailed Apr. 8, 2014.
U.S. Appl. No. 13/628,853—Notice of Allowance Mailed Mar. 4, 2014.
U.S. Appl. No. 13/540,267—Non-Final Office Action Mailed Feb. 4, 2014.
U.S. Appl. No. 13/540,230—Non-Final Office Action Mailed Jan. 30, 2014.
U.S. Appl. No. 13/540,295—Non-Final Office Action Mailed Jan. 30, 2014.
U.S. Appl. No. 13/609,710—Non-Final Office Action Mailed Jan. 27, 2014.
U.S. Appl. No. 13/342,406—Notice of Allowance Mailed Mar. 20, 2014.
U.S. Appl. No. 13/628,853—Non-Final Office Action Mailed Nov. 7, 2013.
U.S. Appl. No. 13/593,905—Notice of Allowance Mailed Oct. 25, 2013.
U.S. Appl. No. 13/595,356—Non-Final Office Action Mailed Apr. 14, 2014.
"Ninth New Collegiate Dictionary", Merriam-Webster Inc., 1991, pp. 77 and 242.
"The American Heritage College Dictionary", Fourth Edition, Houghton Mifflin Company, 2004, pp. 44 and 262.
U.S. Appl. No. 13/342,406—Non-Final Office Action Mailed Sep. 27, 2013.
U.S. Appl. No. 13/610,347—Non-Final Office Action Mailed Jul. 19, 2013.
U.S. Appl. No. 13/610,347—Notice of Allowance Mailed Aug. 19, 2013.
U.S. Appl. No. 13/592,905—Non-Final Office Action Mailed May 8, 2013.
J. Cheng et al., "Context-Aware Object Connection Discovery in Large Graphs", Data Engineering, 2009. ICDE '09. IEEE 25th International Conference on, pp. 856-867.
R. Angles et al., "Survey of Graph Database Models", ACM Computing Surveys, vol. 40, No. 1, Article 1, Feb. 2008, pp. 1-65.
U.S. Appl. No. 13/562,714, Robert R. Friedlander, et al.—Specification and Drawings filed Jul. 31, 2012.
M.J. Flynn, et al., "Sparse Distributed Memory Principles of Operation", Research Institute for Advanced Computer Science, 1989, pp. 1-60.
P. Kanerva, "Hyperdimensional Computing: An Introduction to Computing in Distributed Representation With High-Dimensional Random Vectors", Springer Science+Business Media, LLC, Cogn Comput, 1, 2009, pp. 139-159.
P. Kanerva, "What We Mean When We Say "What'S the Dollar of Mexico?": Prototypes and Mapping in Concept Space", Quantum Informatics for Cognitive, Social, and Semantic Processes: Papers From the AAAI Fall Symposium, Association for the Advancement of Artificial Intelligence, 2010, pp. 2-6.
M. Yu, et al., "Secure and Robust Error Correction for Physical Unclonable Functions", Verifying Physical Trustworthiness of ICS and Systems, IEEE Design & Test of Computers, IEEE, Jan./Feb. 2010, pp. 48-64.
A. Jin, et al., "Biohashing: Two Factor Authentication Featuring Fingerprint Data and Tokenised Random Number," Pattern Recognition 37, Elsevier Ltd., 2004, pp. 2245-2255.
N. Saxena et al., "Data remanence effects on memory-based entropy collection for RFID systems", International Journal of Information Security 10.4 (2011), pp. 213-222.
A. Birrell et al., "A design for high-performance flash disks." ACM SIGOPS Operating Systems Review 41.2 (2007), pp. 88-93.
Richard Saling, "How to Give a Great Presentation! From the HP Learning Center", Jul. 28, 2008, <http://rsaling.wordpress.com/2008/07/28/how-to-give-a-great-presentation/>, pp. 1-28.
K. Matterhorn, "How to Share Data Between a Host Computer & Virtual Machine," EHOW, pp. 1-3, <http://www.ehow.com/how_7385388_share-host-computer-virtual-machine.html>, Retrieved Feb. 17, 2013.
U.S. Appl. No. 13/609,710—Final Office Action Mailed Jul. 24, 2014.
U.S. Appl. No. 13/648,801—Non-Final Office Action Mailed Jul. 1, 2014.

\* cited by examiner

SECURITY FILTER FOR CONTEXT-BASED DATA GRAVITY WELLS

BACKGROUND

The present disclosure relates to the field of computers, and specifically to the use of computers in managing data. Still more particularly, the present disclosure relates to sorting and categorizing data.

Data are values of variables, which typically belong to a set of items. Examples of data include numbers and characters, which may describe a quantity or quality of a subject. Other data can be processed to generate a picture or other depiction of the subject. Data management is the development and execution of architectures, policies, practices and procedures that manage the data lifecycle needs of an enterprise. Examples of data management include storing data in a manner that allows for efficient future data retrieval of the stored data.

SUMMARY

A processor-implemented method, system, and/or computer program product defines multiple security-enabled context-based data gravity wells on a security-enabled context-based data gravity wells membrane. Non-contextual data objects are associated with context objects to define synthetic context-based objects. The synthetic context-based objects are associated with one or more security objects to generate security-enabled synthetic context-based objects, which are parsed into an n-tuple that includes a pointer to one of the non-contextual data objects, a probability that a non-contextual data object has been associated with a correct context object, probability that the security object has been associated with a correct synthetic context-based object, and a weighting factor of importance of the security-enabled synthetic context-based object. A virtual mass of each parsed security-enabled synthetic context-based object is calculated, in order to define a shape of multiple security-enabled context-based data gravity wells that are created when security-enabled synthetic context-based objects are pulled in.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

In one embodiment, instructions are stored on a computer readable storage device (e.g., a CD-ROM), which does not include propagation media.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
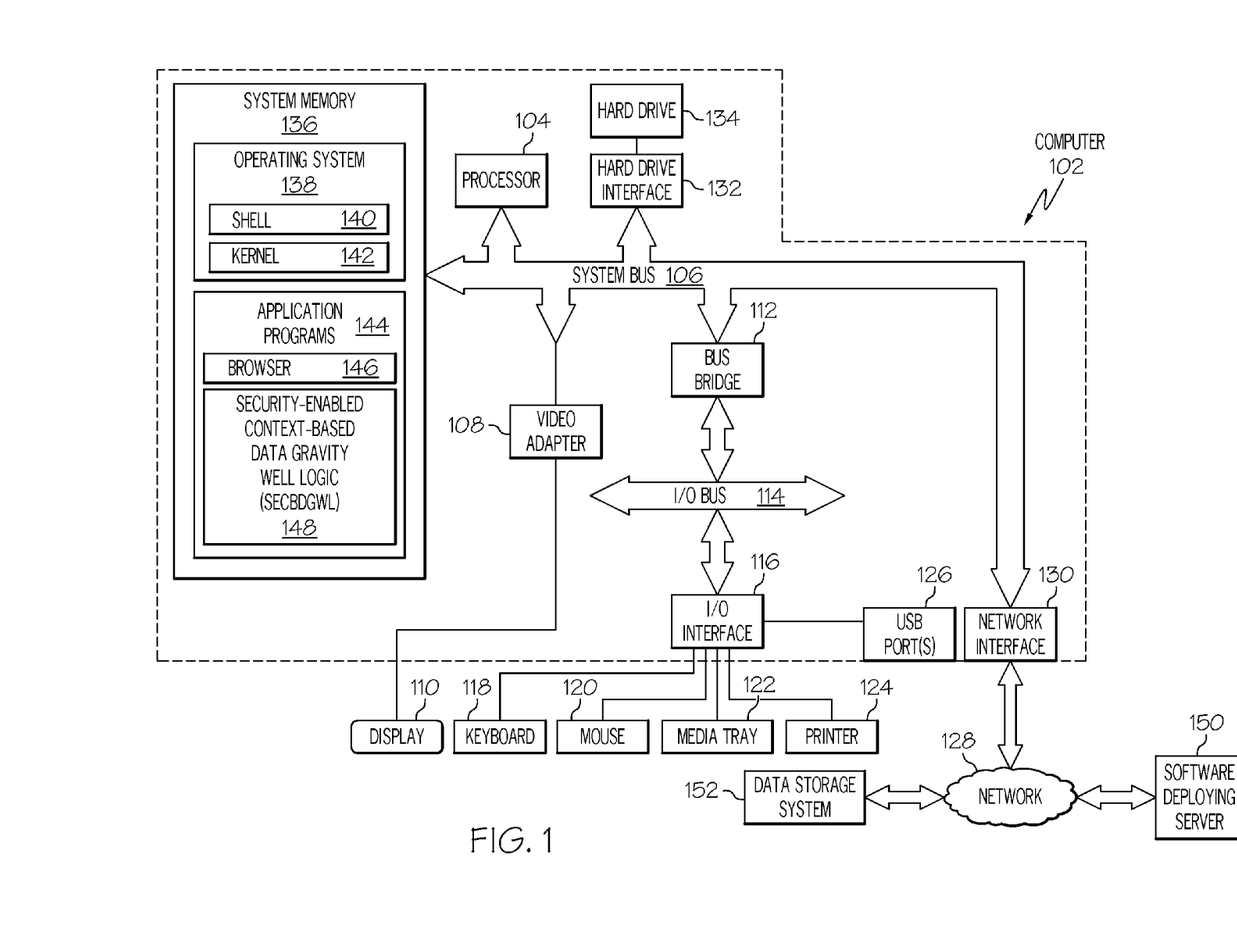
FIG. 1 depicts an exemplary system and network in which the present disclosure may be implemented.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150 and/or data storage system 152.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Figure 5:
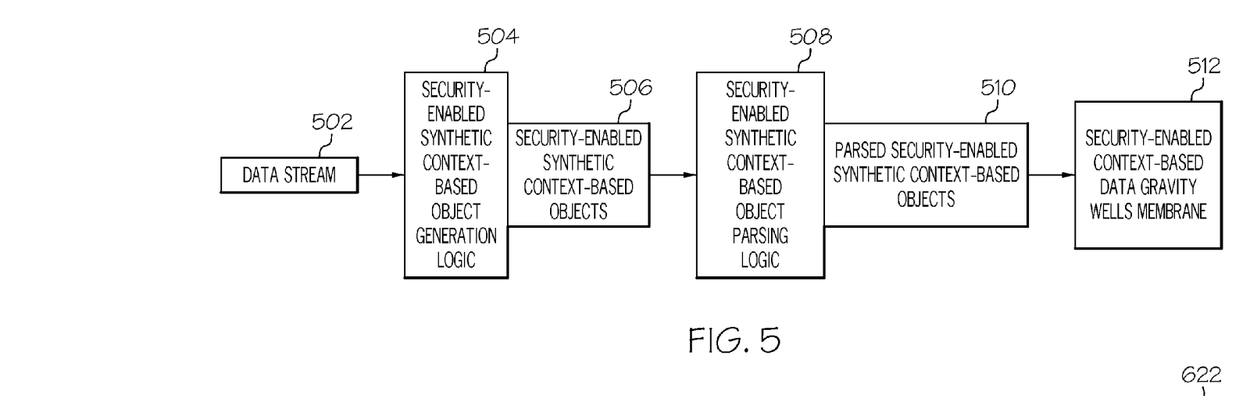
FIG. 5 depicts a process of preparing a data stream for transmission to a security-enabled context-based data gravity wells membrane.
Figure 6:
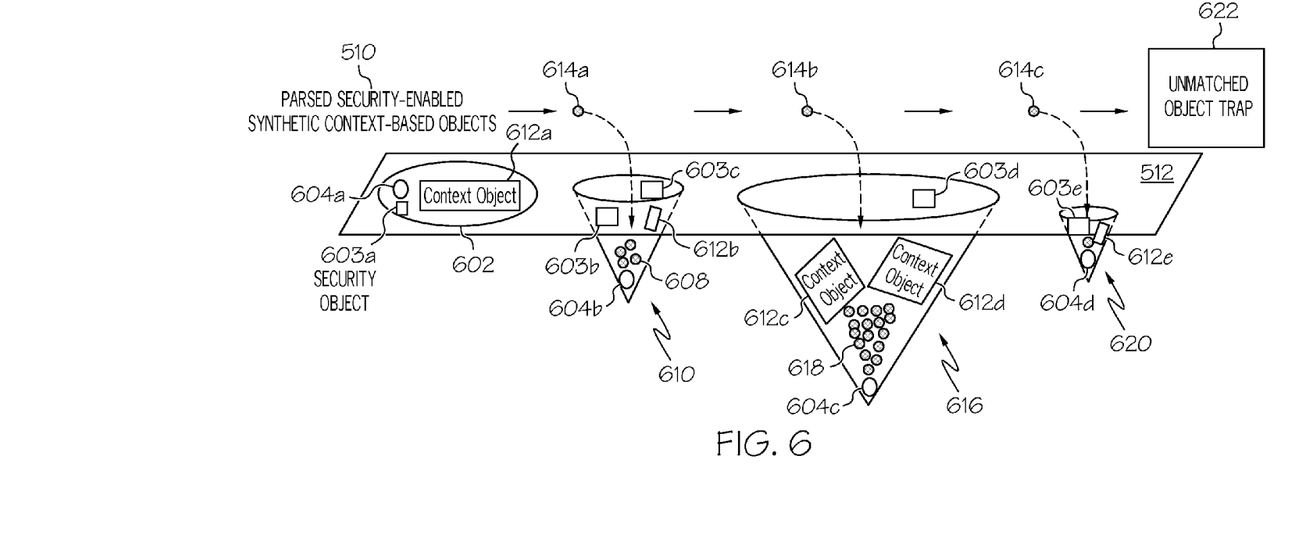
FIG. 6 depicts parsed security-enabled synthetic context-based objects being selectively pulled into security-enabled context-based data gravity well frameworks in order to define security-enabled context-based data gravity wells.

Application programs 144 in computer 102's system memory (as well as software deploying server 150's system memory) also include a security-enabled context-based data gravity well logic (SECBDGWL) 148. SECBDGWL 148 includes code for implementing the processes described below, including those described in FIGS. 2-7, and/or for creating the data gravity wells, membranes, etc. that are depicted in FIGS. 5-6. In one embodiment, computer 102 is able to download SECBDGWL 148 from software deploying server 150, including in an on-demand basis, wherein the code in SECBDGWL 148 is not downloaded until needed for execution. Note further that, in one embodiment of the present invention, software deploying server 150 performs all of the functions associated with the present invention (including execution of SECBDGWL 148), thus freeing computer 102 from having to use its own internal computing resources to execute SECBDGWL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
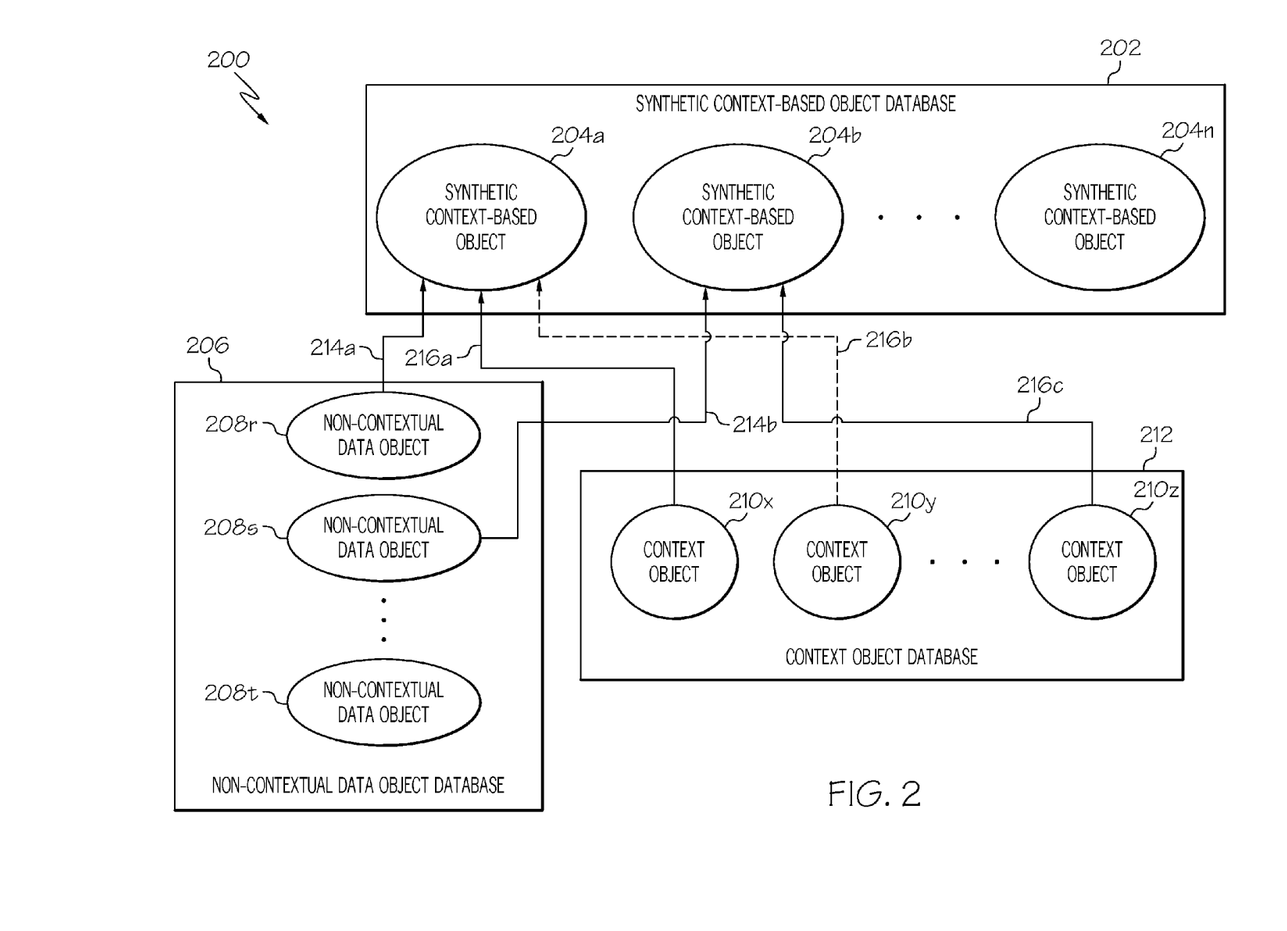
FIG. 2 illustrates a process for generating one or more synthetic context-based objects.

With reference now to FIG. 2, a process for generating one or more synthetic context-based objects in a system 200 is presented. Note that system 200 is a processing and storage logic found in computer 102 and/or data storage system 152 shown in FIG. 1, which process, support, and/or contain the databases, pointers, and objects depicted in FIG. 2.

Within system 200 is a synthetic context-based object database 202, which contains multiple synthetic context-based objects 204a-204n (thus indicating an "n" quantity of objects, where "n" is an integer). Each of the synthetic context-based objects 204a-204n is defined by at least one non-contextual data object and at least one context object. That is, at least one non-contextual data object is associated with at least one context object to define one or more of the synthetic context-based objects 204a-204n. The non-contextual data object ambiguously relates to multiple subject-matters, and the context object provides a context that identifies a specific subject-matter, from the multiple subject-matters, of the non-contextual data object.

Note that the non-contextual data objects contain data that has no meaning in and of itself. That is, the data in the context objects are not merely attributes or descriptors of the data/objects described by the non-contextual data objects. Rather, the context objects provide additional information about the non-contextual data objects in order to give these non-contextual data objects meaning. Thus, the context objects do not merely describe something, but rather they define what something is. Without the context objects, the non-contextual data objects contain data that is meaningless; with the context objects, the non-contextual data objects become meaningful.

For example, assume that a non-contextual data object database 206 includes multiple non-contextual data objects 208r-208t (thus indicating a "t" quantity of objects, where "t" is an integer). However, data within each of these non-contextual data objects 208r-208t by itself is ambiguous, since it has no context. That is, the data within each of the non-contextual data objects 208r-208t is data that, standing alone, has no meaning, and thus is ambiguous with regards to its subject-matter. In order to give the data within each of the non-contextual data objects 208r-208t meaning, they are given context, which is provided by data contained within one or more of the context objects 210x-210z (thus indicating a "z" quantity of objects, where "z" is an integer) stored within a context object database 212. For example, if a pointer 214a points the non-contextual data object 208r to the synthetic context-based object 204a, while a pointer 216a points the context object 210x to the synthetic context-based object 204a, thus associating the non-contextual data object 208r and the context object 210x with the synthetic context-based object 204a (e.g., storing or otherwise associating the data within the non-contextual data object 208r and the context object 210x in the synthetic context-based object 204a), the data within the non-contextual data object 208r now has been given unambiguous meaning by the data within the context object 210x. This contextual meaning is thus stored within (or otherwise associated with) the synthetic context-based object 204a.

Similarly, if a pointer 214b associates data within the non-contextual data object 208s with the synthetic context-based object 204b, while the pointer 216c associates data within the context object 210z with the synthetic context-based object 204b, then the data within the non-contextual data object 208s is now given meaning by the data in the context object 210z. This contextual meaning is thus stored within (or otherwise associated with) the synthetic context-based object 204b.

Note that more than one context object can give meaning to a particular non-contextual data object. For example, both context object 210x and context object 210y can point to the synthetic context-based object 204a, thus providing compound context meaning to the non-contextual data object 208r shown in FIG. 2. This compound context meaning provides various layers of context to the data in the non-contextual data object 208r.

Note also that while the pointers 214a-214b and 216a-216c are logically shown pointing toward one or more of the synthetic context-based objects 204a-204n, in one embodiment the synthetic context-based objects 204a-204n actually point to the non-contextual data objects 208r-208t and the context objects 210x-210z. That is, in one embodiment the synthetic context-based objects 204a-204n locate the non-contextual data objects 208r-208t and the context objects 210x-210z through the use of the pointers 214a-214b and 216a-216c.

Figure 3:
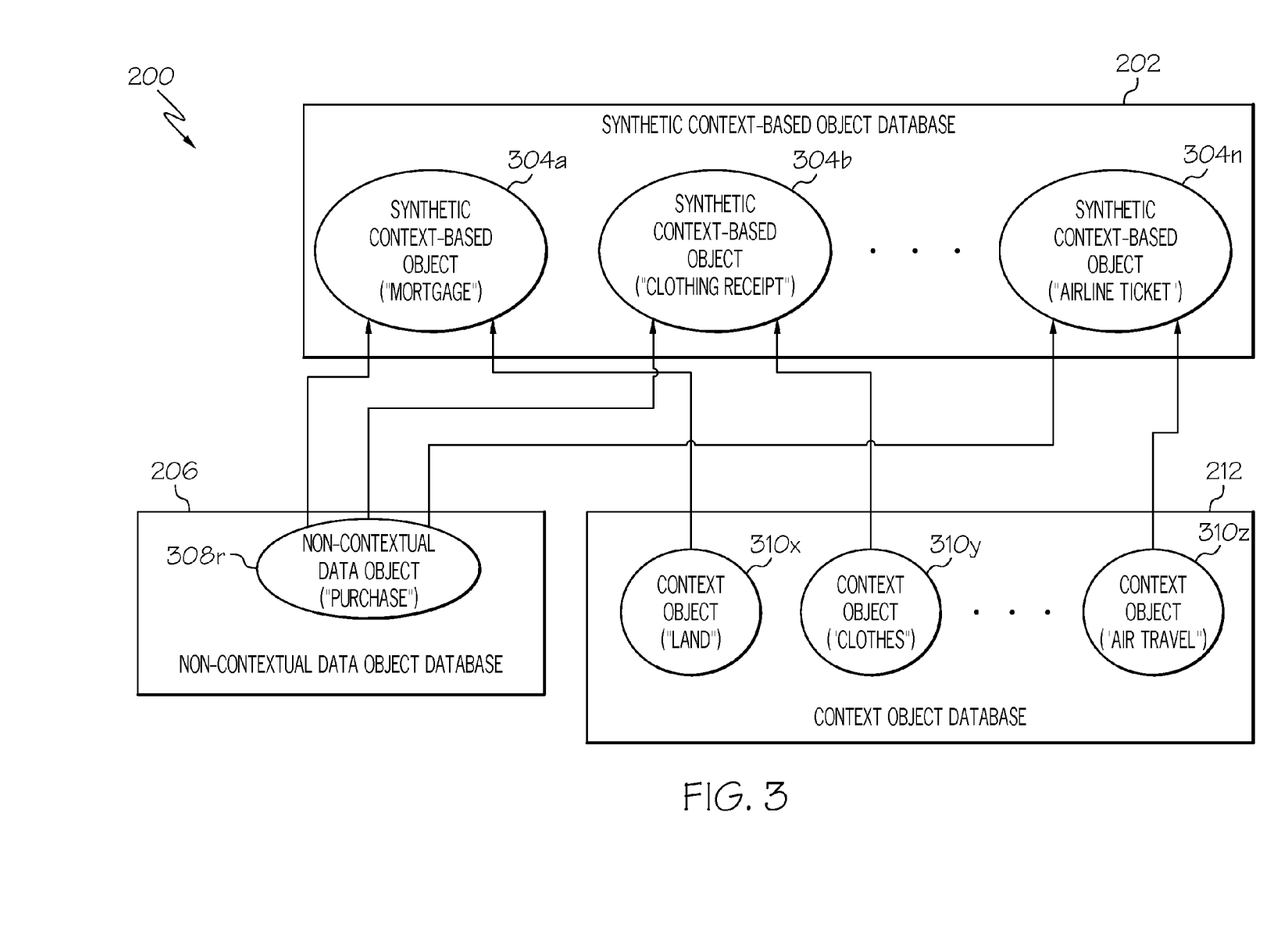
FIG. 3 depicts an exemplary case in which synthetic context-based objects are defined for the non-contextual data object datum "Purchase"

Consider now an exemplary case depicted in FIG. 3, in which synthetic context-based objects are defined for the non-contextual datum object "purchase". Standing alone, without any context, the word "purchase" is meaningless, since it is ambiguous and does not provide a reference to any particular subject-matter. That is, "purchase" may refer to a financial transaction, or it may refer to moving an item using mechanical means. Furthermore, within the context of a financial transaction, "purchase" has specific meanings. That is, if the purchase is for real property (e.g., "land"), then a mortgage company may use the term to describe a deed of trust associated with a mortgage, while a title company may use the term to describe an ownership transfer to the purchaser. Thus, each of these references is within the context of a different subject-matter (e.g., mortgages, ownership transfer, etc.).

In the example shown in FIG. 3, then, data (i.e., the word "purchase") from the non-contextual data object 308r is associated with (e.g., stored in or associated by a look-up table, etc.) a synthetic context-based object 304a, which is devoted to the subject-matter "mortgage". The data/word "purchase" from non-contextual data object 308r is also associated with a synthetic context-based object 304b, which is devoted to the subject-matter "clothing receipt". Similarly, the data/word "purchase" from non-contextual data object 308r is also associated with a synthetic context-based object 304n, which is devoted to the subject-matter "airline ticket".

In order to give contextual meaning to the word "purchase" (i.e., define the term "purchase") in the context of "land", context object 310x, which contains the context datum "land", is associated with (e.g., stored in or associated by a look-up table, etc.) the synthetic context-based object 304a. Associated with the synthetic context-based object 304b is a context object 310y, which provides the context/datum of "clothes" to the term "purchase" provided by the non-contextual data object 308r. Thus, the synthetic context-based object 304b defines "purchase" as that which is related to the subject-matter "clothing receipt", including electronic, e-mail, and paper evidence of a clothing sale. Associated with the synthetic context-based object 304n is a context object 310z, which provides the context/datum of "air travel" to the term "purchase" provided by the non-contextual data object 308r. Thus, the synthetic context-based object 304n defines "purchase" as that which is related to the subject-matter "airline ticket", including electronic, e-mail, and paper evidence of a person's right to board a particular airline flight.

In one embodiment, the data within a non-contextual data object is even more meaningless if it is merely a combination of numbers and/or letters. For example, consider the scenario in which data "10" were to be contained within a non-contextual data object 308r depicted in FIG. 3. Standing alone, without any context, this number is meaningless, identifying no particular subject-matter, and thus is completely ambiguous. That is, "10" may relate to many subject-matters. However, when associated with context objects that define certain types of businesses, then "10" is inferred (using associative logic such as that found in SECBDGWL 148 shown in FIG. 1) to relate to acreage when associated with context object 310x, to a clothing size when associated with context object 310y, and to thousands of air miles (credits given by an airline to be used in future ticket purchases) when associated with context object 310z. That is, the data "10" is so vague/meaningless without the associated context object that the data does not even identify the units that the term describes, much less the context of these units.

Figure 4:
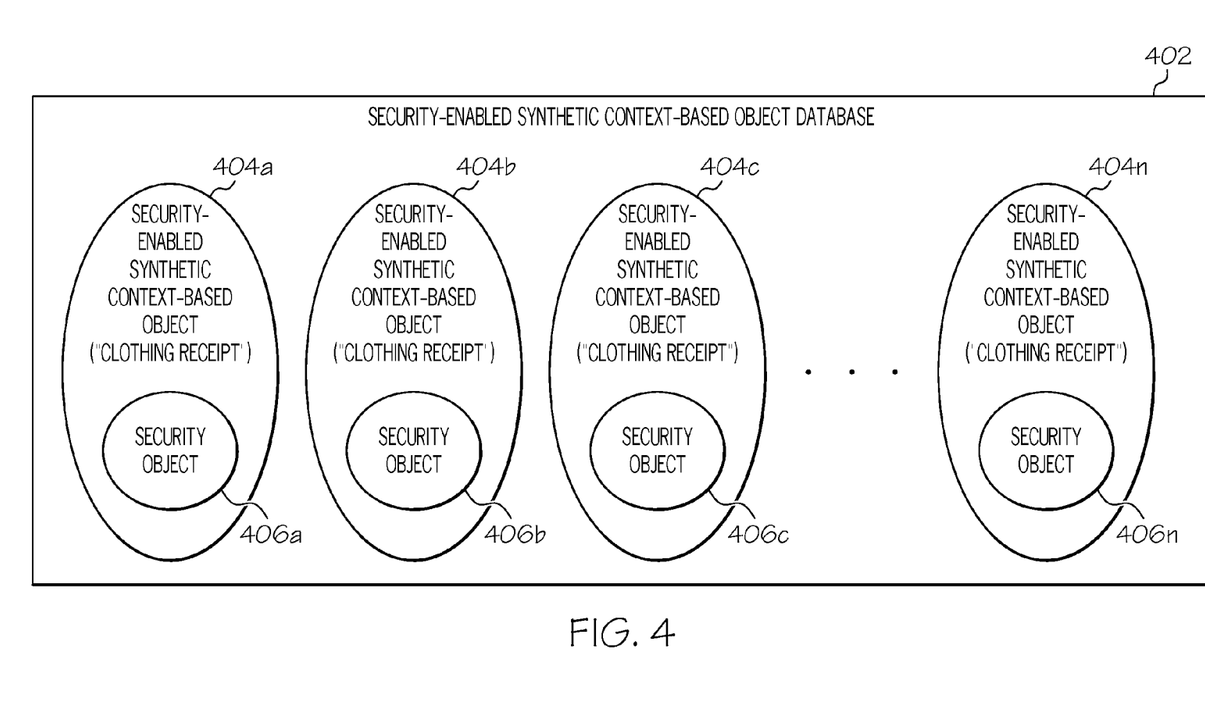
FIG. 4 illustrates an exemplary case in which synthetic context-based objects and security objects are used to generate security-enabled synthetic context-based objects.

With reference now to FIG. 4, an exemplary case in which synthetic context-based objects and security objects are used to generate security-enabled synthetic context-based objects is presented. A security-enabled synthetic context-based object database 402 holds multiple security-enabled synthetic context-based objects 404a-404n (where "n" is an integer). Security-enabled synthetic context-based objects 404a-404n are similar to the synthetic context-based object 304b shown in FIG. 3, except that each of the security-enabled synthetic context-based objects 404a-404n also includes a security object (depicted as security objects 406a-406n). While context objects 310y provided meaning to a non-contextual data object 308r ("purchase") in FIG. 3, security objects 406a-406n provide a circumstance in which the security-enabled synthetic context-based object 404a-404n exist.

For example, assume that security object 406a describes the circumstance in which a person is at a particular location (i.e., a country, a city, a particular store, etc.). This location can be determined by that person's GPS-enabled cell phone, that person flying on an airline to a particular city (as identified by a flight manifest), that person checking into a particular hotel, etc. Once the person's location is determined, the security object 406a identifies that person's location, and appends itself to the security-enabled synthetic context-based object 404a. The clothing receipt (i.e., proof of a purchase of a particular type of clothing) is deemed to pass security scrutiny only if the purchase is where the person is supposed to be (according to security object 406a).

In another example, assume that security object 406b describes the circumstance in which a person performs an act that is directly unrelated to making the clothing purchase. For example, assume that a person checked out of a hospital and then, in contravention to that person's usual buying habits, purchased a flowing robe (e.g., a kaftan) or similar loose-fitting clothing (e.g., a "Hawaiian shirt", dashiki, etc.). While such a purchase would ordinarily trigger an alarm, since it would be for a type of clothing that this person has never worn, the hospital check-out data indicates that the person suffered a broken extremity (arm, leg), which would make the wearing of tight fitting clothing impossible. Thus, security object 406b makes the purchase of a flowing robe expected.

In another example, assume that security object 406c describes the circumstance in which a person purchases clothing that comports with his known traits. For example, if a person is known to be a fan of a certain professional athletic team (e.g., as described in his entries on a social network website), then the security object 406c describes this person's allegiance to that team. Thus, a purchase of clothing with that team's logo would be expected (and thus pass security scrutiny), while purchasing clothing with the logo of that team's arch-rival would be unexpected (and thus fail scrutiny scrutiny).

In another example, assume that security object 406n describes the circumstance in which a person has a buying history of purchasing clothing of a particular style, size, price range, brand, etc., including purchases from a particular store or type of store. Thus, a purchase of clothing of that type (and/or from a particular store) would be expected (and thus pass security scrutiny), while purchasing clothing of another style/type and/or from another store would be unexpected (and thus fail scrutiny scrutiny).

Note that, in one embodiment, a single security-enabled synthetic context-based object may have multiple security objects associated therewith.

With reference now to FIG. 5, a process of preparing a data stream for transmission to a security-enabled context-based data gravity wells membrane is presented. A data stream 502 is initially received. For example, assume that an enterprise is tracking sales at a particular store. In this example, the data stream 502 may be real-time data that describes what products are being sold, their price, their profit margin, the store location, etc. In one embodiment, however, the data stream 502 only includes "raw" data, which has no contextual meaning. In order to give this raw data contextual meaning, the raw data (i.e., non-contextual data objects) are associated with one or more context objects, as described above in FIG. 2-FIG. 3, through the use of a security-enabled synthetic context-based object generation logic 504 (i.e., part of SECBDGWL 148 depicted in FIG. 1). Security-enabled synthetic context-based object generation logic 504 thus converts the data stream 502 into security-enabled synthetic context-based objects 506 (e.g., the security-enabled synthetic context-based objects 404a-404n located in security-enabled synthetic context-based object database 402 in FIG. 4).

In order to properly utilize the synthetic context-based objects 506, a security-enabled synthetic context-based object parsing logic 508 parses the synthetic context-based objects 506 into parsed security-enabled synthetic context-based objects 510. These parsed security-enabled synthetic context-based objects 510 make up an n-tuple (i.e., an ordered list of "n" descriptive elements (where "n" is an integer) that describe each of the security-enabled synthetic context-based objects 506. In one embodiment, this n-tuple includes a pointer (e.g., a locating pathway) to the non-contextual data object in the synthetic context-based object. This pointer may be to a storage location (e.g., a universal resource locator (URL) address at which the non-contextual data object is stored), such that the security-enabled synthetic context-based objects 506 must be generated, or the pointer may be local (such that the security-enabled synthetic context-based objects 506 exist locally as part of a streaming data packet, etc.). In one embodiment, the n-tuple also includes a probability value that a non-contextual data object has been associated with a correct context object. That is, a correct context object may or may not be associated with a particular non-contextual data object. For example, the non-contextual data object may be incomplete (i.e., a fragment, a corrupted version, etc.) version of the actual non-contextual data. As such, a "guess" must be made to determine which context data should be associated with that corrupted non-contextual data. In this example, assume that the corrupted non-contextual data object contains the value "3.13", and that the data is related to areas of circles. If the value of the non-contextual data object had been "3.14159", then there is a high probability (e.g., is predetermined to have a 99% probability) that the context of this data object is the ratio of a circle's area divided by that circle's radius-squared (i.e., is "pi"). However, a pre-determination may be made, based on probability calculations such as those using a Bayesian probability formula, that the likelihood of "3.13" being the ratio of a circle's area divided by that circle's radius-squared is only 85%.

In one embodiment, one of the parameters/values from the n-tuple is a weighting factor of importance of the security-enabled synthetic context-based object. In one embodiment, this weighting factor is how "important" this particular security-enabled synthetic context-based object is to an enterprise's project. For example, assume that an enterprise project is to track sales of a particular product at a particular store. If the security-enabled synthetic context-based object contains information regarding how many units of this particular product have been sold at this store during a particular time period, then this security-enabled synthetic context-based object is given (either manually or by an algorithm) an "importance" rating of 95 out of 100. However, if the security-enabled synthetic context-based object describes whether the items are being paid for with cash or credit cards, such information is deemed less important (e.g., is given an "importance" rating of 30 out of 100). Note that an algorithm to determine (and/or predetermine) these importance ratings can utilize flags, metadata, etc. to determine the importance of the security-enabled synthetic context-based objects. For example, assume that a particular security-enabled synthetic context-based object has a flag indicating that it describes a quantity of products sold at a particular store on a particular day. Assume further that a software program for an enterprise project to track such products also has this flag. Thus, if the two flags match, then a high level of importance (e.g., over 95 on a scale of 100) is assigned to security-enabled synthetic context-based objects that have this flag.

The parsed security-enabled synthetic context-based objects 510 are then sent to a security-enabled context-based data gravity wells membrane 512. The security-enabled context-based data gravity wells membrane 512 is a virtual mathematical membrane that is capable of supporting multiple security-enabled context-based data gravity wells. That is, the security-enabled context-based data gravity wells membrane 512 is a mathematical framework that is part of a program such as SECBDGWL 148 shown in FIG. 1. This mathematical framework is able to 1) provide a virtual environment in which the multiple security-enabled context-based data gravity wells exist; 2) populate the multiple security-enabled context-based data gravity wells with appropriate security-enabled synthetic context-based objects (e.g., those security-enabled synthetic context-based objects having non-contextual data objects, context objects, and security objects that match those found in the structure of a particular security-enabled context-based data gravity well); and 3) support the visualization/display of the security-enabled context-based data gravity wells on a display.

For example, consider FIG. 6, which depicts parsed security-enabled synthetic context-based objects 510 being selectively pulled into security-enabled context-based data gravity well frameworks in order to define security-enabled context-based data gravity wells. Security-enabled context-based data gravity wells membrane 512 supports multiple security-enabled context-based data gravity well frameworks. For example, consider security-enabled context-based data gravity well framework 602. A security-enabled context-based data gravity well framework is defined as a construct that includes the capability of pulling data objects from a streaming data flow, such as parsed security-enabled synthetic context-based objects 510, and storing same if a particular parsed security-enabled synthetic context-based object contains a particular non-contextual data object 604a and/or a particular context object 612a and/or a particular security object 603a (where non-contextual data object 604a and context object 612a and security object 603a are defined above). Note that security-enabled context-based data gravity well framework 602 is not yet populated with any parsed security-enabled synthetic context-based objects, and thus is not yet a security-enabled context-based data gravity well. However, security-enabled context-based data gravity well framework 606 is populated with parsed security-enabled synthetic context-based objects 608, and thus has been transformed into a security-enabled context-based data gravity well 610. This transformation occurred when security-enabled context-based data gravity well framework 606, which contains (i.e., logically includes and/or points to) a non-contextual data object 604b and a context object 612b and security objects 603b-603c, all (or at least a predetermined percentage) of which are part of each of the security-enabled synthetic context-based objects 608 such as parsed security-enabled synthetic context-based objects 614a, are populated with one or more parsed security-enabled synthetic context-based objects.

Note that parsed security-enabled synthetic context-based objects 510, including parsed security-enabled synthetic context-based objects 614a-614c, are streaming in real-time from a data source across the security-enabled context-based data gravity wells membrane 512. If a particular parsed security-enabled synthetic context-based object is never pulled into any of the context-based data gravity wells on the security-enabled context-based data gravity wells membrane 512, then that particular parsed security-enabled synthetic context-based object is trapped in an unmatched object trap 622. In one embodiment, only those parsed security-enabled synthetic context-based objects that do not have a security object found in any of the security-enabled context-based data gravity wells are trapped in the unmatched object trap 622, while those parsed security-enabled synthetic context-based objects that are missing a context object simply continue to stream to another destination.

Consider now security-enabled context-based data gravity well 616. Note that security-enabled context-based data gravity well 616 includes two context objects 612c-612d and a non-contextual data object 604c and a single security object 603d. The presence of context objects 612c-612d (which in one embodiment are graphically depicted on the walls of the security-enabled context-based data gravity well 616) and non-contextual data object 604c and security object 603a within security-enabled context-based data gravity well 616 causes security-enabled synthetic context-based objects such as parsed security-enabled synthetic context-based object 614b to be pulled into security-enabled context-based data gravity well 616. Note further that security-enabled context-based data gravity well 616 is depicted as being larger than security-enabled context-based data gravity well 610, since there are more security-enabled synthetic context-based objects (618) in security-enabled context-based data gravity well 616 than there are in security-enabled context-based data gravity well 610.

Note that, in one embodiment, the security-enabled context-based data gravity wells depicted in FIG. 6 can be viewed as security-enabled context relationship density wells. That is, the security-enabled context-based data gravity wells have a certain density of objects, which is due to a combination of how many objects have been pulled into a particular well as well as the weighting assigned to the objects, as described herein.

Note that in one embodiment, it is the quantity of security-enabled synthetic context-based objects that have been pulled into a particular security-enabled context-based data gravity well that determines the size and shape of that particular security-enabled context-based data gravity well. That is, the fact that security-enabled context-based data gravity well 616 has two context objects 612c-612d while security-enabled context-based data gravity well 610 has only one context object 612b has no bearing on the size of security-enabled context-based data gravity well 616. Rather, the size and shape of security-enabled context-based data gravity well

616 in this embodiment is based solely on the quantity of security-enabled synthetic context-based objects such as parsed security-enabled synthetic context-based object 614b (each of which contain a non-contextual data object 604c and context objects 612c-612d and security object 603d) that are pulled into security-enabled context-based data gravity well 616. For example, security-enabled context-based data gravity well 620 has a single non-contextual data object 604d and a single context object 612e, just as security-enabled context-based data gravity well 610 has a single non-contextual data object 604b and a single context object 612b. However, because security-enabled context-based data gravity well 620 is populated with only one parsed security-enabled synthetic context-based object 614c, it is smaller than security-enabled context-based data gravity well 610, which is populated with four security-enabled synthetic context-based objects 608 (e.g., four instances of the parsed security-enabled synthetic context-based object 614a).

In one embodiment, the security-enabled context-based data gravity well frameworks and/or security-enabled context-based data gravity wells described in FIG. 6 are graphical representations of 1) sorting logic and 2) data storage logic that is part of SECBDGWL 148 shown in FIG. 1. That is, the security-enabled context-based data gravity well frameworks define the criteria that are used to pull a particular parsed security-enabled synthetic context-based object into a particular security-enabled context-based data gravity well, while the security-enabled context-based data gravity wells depict the quantity of parsed security-enabled synthetic context-based objects that have been pulled into a particular security-enabled context-based data gravity well. Note that in one embodiment, the original object from the stream of parsed security-enabled synthetic context-based objects 510 goes into an appropriate security-enabled context-based data gravity well, with no copy of the original being made. In another embodiment, a copy of the original object from the stream of parsed security-enabled synthetic context-based objects 510 goes into an appropriate security-enabled context-based data gravity well, while the original object continues to its original destination (e.g., a server that keeps a database of inventory of items at a particular store). In another embodiment, the original object from the stream of parsed security-enabled synthetic context-based objects 510 goes into an appropriate security-enabled context-based data gravity well, while the copy of the original object continues to its original destination (e.g., a server that keeps a database of inventory of items at a particular store).

Figure 7:
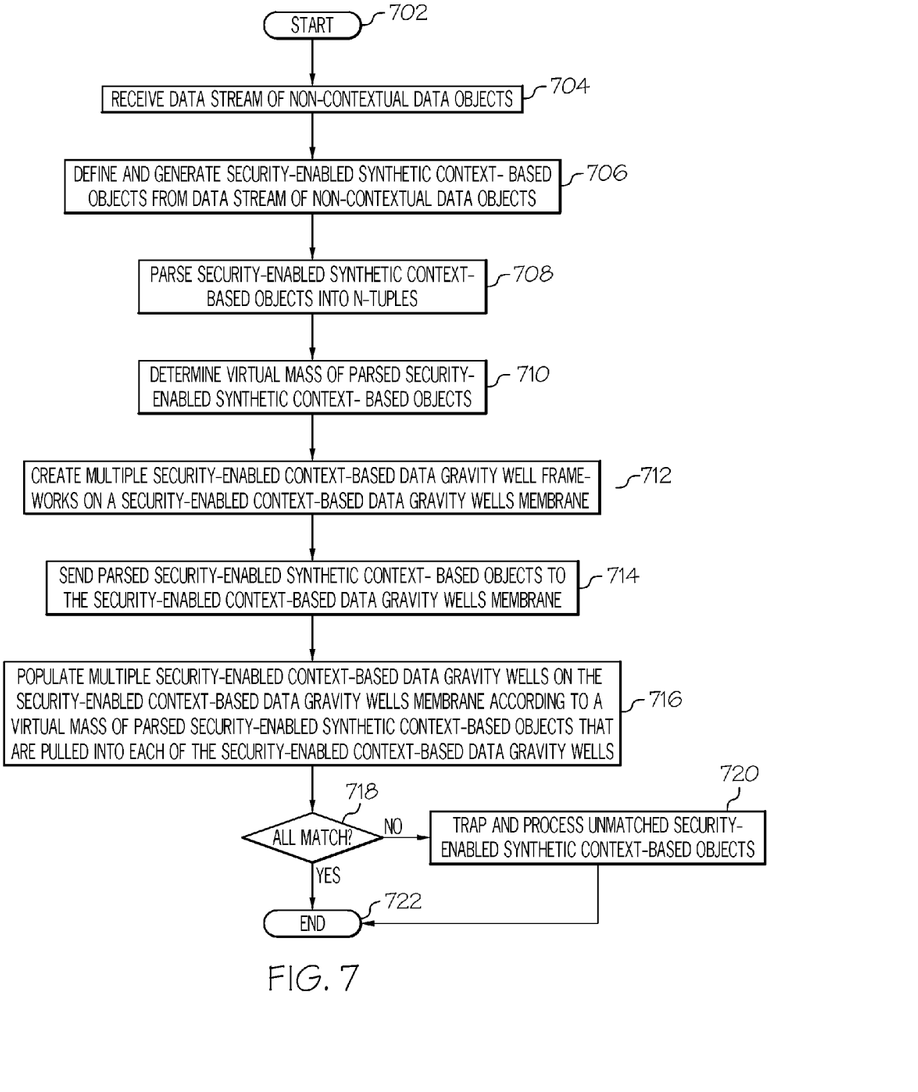
FIG. 7 is a high-level flow chart of one or more steps performed by a processor to define multiple security-enabled context-based data gravity wells on a security-enabled context-based data gravity wells membrane.

With reference now to FIG. 7, a high-level flow chart of one or more steps performed by a processor to define multiple security-enabled context-based data gravity wells on a security-enabled context-based data gravity wells membrane is presented. After initiator block 702, a data stream (e.g., element 502 in FIG. 5) of non-contextual data objects is received by a processor (block 704). As described herein, each of the non-contextual data objects ambiguously relates to multiple subject-matters. As described in block 706, the processor then associates each of the non-contextual data objects with one or more context objects and one or more security objects, in order to define a synthetic security-enabled context-based object. As described herein (e.g., see FIG. 2 above), the context object provides a context that identifies a specific subject-matter, from the multiple subject-matters, for the non-contextual data objects. As described herein (e.g., see FIG. 4 above), the security objects provide a circumstance/situation that describes the environment in which an event is occurring.

As depicted in block 708, the processor parses the security-enabled synthetic context-based object into an n-tuple. Each n-tuple comprises a pointer to said one of the non-contextual data objects, a probability that a non-contextual data object has been associated with a correct context object, a weighting factor of importance of the security-enabled synthetic context-based object, and a probability that the security object has been associated with a correct synthetic context-based object, as described above with reference to FIG. 5.

With respect to block 710, the processor calculates a virtual mass of each of the parsed security-enabled synthetic context-based objects. In one embodiment, the virtual mass of the parsed security-enabled synthetic context-based object is derived from a formula $(P(C)+P(S))\times Wt(S)$, where $P(C)$ is the probability that the non-contextual data object has been associated with the correct context object, $P(S)$ is the probability that the security object has been associated with the correct synthetic context-based object, and $Wt(S)$ is the weighting factor of importance of the security-enabled synthetic context-based object (see the narrative description of FIG. 5 above). As described herein, in one embodiment the weighting factor of importance of the security-enabled synthetic context-based object is based on how important the security-enabled synthetic context-based object is to a particular project.

As described in block 712, the processor creates multiple security-enabled context-based data gravity well frameworks on a security-enabled context-based data gravity wells membrane. Each of the multiple security-enabled context-based data gravity well frameworks comprises at least one non-contextual data object, at least one context object, and at least one security object. As described herein, the security-enabled context-based data gravity wells membrane is a virtual mathematical membrane that is capable of supporting multiple security-enabled context-based data gravity wells (see FIG. 6 above).

As described in block 714, multiple parsed security-enabled synthetic context-based objects are then transmitted to the security-enabled context-based data gravity wells membrane. That is, these parsed security-enabled synthetic context-based objects are then transmitted to an algorithmic environment in which the logic-enabled security-enabled context-based data gravity well frameworks exist. These security-enabled context-based data gravity well frameworks are algorithmically generated based on their ability to attract specific security-enabled synthetic context-based objects. As described in block 716, this pulling/attraction enables the processor to define multiple security-enabled context-based data gravity wells according to the virtual mass of multiple parsed security-enabled synthetic context-based objects that are pulled into each of the security-enabled context-based data gravity well frameworks. As described herein, each of the multiple parsed security-enabled synthetic context-based objects is pulled into a particular security-enabled context-based data gravity well in response to values from its n-tuple matching at least one non-contextual data object and at least one context object and at least one security object that is part of the particular security-enabled context-based data gravity well.

In one embodiment, the generated security-enabled context-based data gravity wells are presented on a display according to a combined virtual mass of the multiple parsed security-enabled synthetic context-based objects that populate each security-enabled context-based data gravity well (see FIG. 6 above). That is, a first security-enabled context-based data gravity well that holds a more virtually massive combination of parsed security-enabled synthetic context-based objects than a second security-enabled context-based data gravity well will be larger, and thus is visually depicted on a display as extending farther away from the security-enabled context-based data gravity wells membrane than the second security-enabled context-based data gravity well.

In one embodiment, the construction of the security-enabled context-based data gravity wells is temporally dynamic. That is, in this embodiment, the processor determines an age (i.e., how "stale" or "old") each of the multiple parsed security-enabled synthetic context-based objects that have been pulled into the particular security-enabled context-based data gravity well is. Based on the age of each of these objects, the processor removes, from the particular security-enabled context-based data gravity well that holds a stale object, any parsed security-enabled synthetic context-based object that is older than a predetermined age.

In one embodiment, a likelihood that a particular security-enabled synthetic context-based object is pulled into an appropriate security-enabled context-based data gravity well is performed using a Bayesian probability formula. That is, an appropriate security-enabled context-based data gravity well is defined as a context-based data gravity well whose framework includes at least one non-contextual object and at least one context object and at least one security object found in a security-enabled synthetic context-based object that is pulled into that particular (appropriate) security-enabled context-based data gravity well.

For example, in order to determine a likelihood that a particular security-enabled synthetic context-based object is pulled into an appropriate security-enabled context-based data gravity well, assume that A represents the event that a particular security-enabled synthetic context-based object is a good populator of a particular security-enabled context-based data gravity well, and B represents the event that the particular security-enabled synthetic context-based object has a predefined amount of confirmed context objects applied to its non-contextual data object. This results in the Bayesian probability formula of:

$$P(A \mid B) = \frac{P(B \mid A)P(A)}{P(B)}$$

where:
P(A|B) is the probability that a security-enabled synthetic context object will be an appropriate populator of a particular security-enabled context-based data gravity well (A) given that (|) a predefined amount of confirmed context objects are applied to the non-contextual data object in a security-enabled synthetic context-based object (B);
P(B|A) is the probability that the predefined amount of confirmed context-based objects are applied to the non-contextual data object in the security-enabled synthetic context-based object (B) given that (|) the security-enabled synthetic context-based object is assigned to the particular security-enabled context-based data gravity well (A);
P(A) is the probability that the particular security-enabled synthetic context-based object will be the appropriate populator of the particular security-enabled context-based data gravity well regardless of any other information; and
P(B) is the probability that the particular security-enabled synthetic context-based object will have the predefined amount of confirmed context objects regardless of any other information.

For example, assume that nine out of ten of the security-enabled synthetic context-based objects that populate a particular security-enabled context-based data gravity well have the predefined amount (e.g., 80%) of the context objects that are on the sides of the particular security-enabled context-based data gravity well (e.g., elements 310x-310z in FIG. 3). Thus, P(B|A)=9/10=0.90. Assume also that the odds that any security-enabled synthetic context-based object will be an appropriate populator of a particular security-enabled context-based data gravity well, regardless of any other information (P(A)), is 0.20, and that the probability that any security-enabled synthetic context-based object will have the predefined amount of confirmed context objects regardless of any other information (P(B)) is 0.25. The probability that any one security-enabled synthetic context-based object will be a good populator of a particular security-enabled context-based data gravity well (based on these parameters) is 72%:

$$P(A \mid B) = \frac{.90 * .20}{.25} = .72$$

However, if nine out of ten of the security-enabled synthetic context-based objects that populate a particular security-enabled context-based data gravity well still have the predefined amount (e.g., 80%) of the context objects that are on the sides of the particular security-enabled context-based data gravity well (P(B|A)=9/10=0.90), but now the odds that any security-enabled synthetic context-based object will be an appropriate populator of a particular security-enabled context-based data gravity well, regardless of any other information (P(A)), is 25%, and the probability that any security-enabled synthetic context-based object will have the predefined amount of confirmed context objects regardless of any other information (P(B)) is now 23%, then the probability that any one security-enabled synthetic context-based object will be a good populator of a particular security-enabled context-based data gravity well (based on these new parameters) is 98%:

$$P(A \mid B) = \frac{.90 * .25}{.23} = .98$$

As depicted in query block 718, a query is made to determine if all of the security-enabled synthetic context-based objects (e.g., parsed security-enabled synthetic context-based objects 610 shown in FIG. 6) have a security object that matches that security object found in an appropriate security-enabled context-based data gravity well framework (e.g., element 602 found in FIG. 6). If not, then these unmatched security-enabled synthetic context-based objects are trapped in an unmatched object trap (e.g., element 622 in FIG. 6). In one embodiment, these trapped unmatched parsed security-enabled synthetic context-based objects are processed to generate an alert, which indicates that one or more unmatched parsed security-enabled synthetic context-based objects represent a financially fraudulent event, a secure electronic communication that is lacking a proper password (i.e., where the security object is one or more such passwords), secure data is lacking a proper password key (i.e., where the security object is one or more security keys and/or the unmatched parsed security-enabled synthetic context-based object is not encrypted), etc.

The process depicted in FIG. 7 ends at terminator block 722.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

The invention claimed is:

1. A processor-implemented method of defining multiple security-enabled context-based data gravity wells on a security-enabled context-based data gravity wells membrane, the processor-implemented method comprising:

receiving a data stream of non-contextual data objects, wherein each of the non-contextual data objects ambiguously relates to multiple subject-matters;

associating, by one or more hardware processors, one of the non-contextual data objects with a context object to define a synthetic context-based object, wherein the context object provides a context that identifies a specific subject-matter, from the multiple subject-matters, of said one of the non-contextual data objects;

associating, by one or more hardware processors, the synthetic context-based object with a security object to generate a security-enabled synthetic context-based object, wherein the security object describes a circumstance that describes an environment in which an event is occurring;

parsing, by one or more hardware processors, the security-enabled synthetic context-based object into an n-tuple, wherein the n-tuple comprises a pointer to said one of the non-contextual data objects, a probability that a non-contextual data object has been associated with a correct context object, a weighting factor of importance of the security-enabled synthetic context-based object, and a probability that the security object has been associated with a correct synthetic context-based object;

calculating, by one or more hardware processors, a virtual mass of the parsed security-enabled synthetic context-based object, wherein the virtual mass of the parsed security-enabled synthetic context-based object is derived from a formula of:

$$(P(C)+P(S)) \times Wt(S),$$

where $P(C)$ is the probability that the non-contextual data object has been associated with the correct context object, wherein $P(S)$ is the probability that the security object has been associated with the correct synthetic context-based object, and where $Wt(S)$ is the weighting factor of importance of the security-enabled synthetic context-based object;

creating, by one or more hardware processors, multiple security-enabled context-based data gravity well frameworks on a security-enabled context-based data gravity wells membrane, wherein each of the multiple security-enabled context-based data gravity well frameworks comprises at least one non-contextual data object, at least one context object, and at least one security object, and wherein the security-enabled context-based data gravity wells membrane is a virtual mathematical membrane that is capable of supporting multiple security-enabled context-based data gravity wells;

transmitting multiple parsed security-enabled synthetic context-based objects to the security-enabled context-based data gravity wells membrane;

defining, by said one or more hardware processors, multiple security-enabled context-based data gravity wells according to the virtual mass of multiple parsed security-enabled synthetic context-based objects that are pulled into each of the security-enabled context-based data gravity well frameworks, wherein each of the multiple parsed security-enabled synthetic context-based objects is pulled into a particular security-enabled context-based data gravity well in response to values from its n-tuple matching said at least one non-contextual data object, said at least one context object, and said at least one security object in said particular security-enabled context-based data gravity well; and in response to an unmatched parsed security-enabled synthetic context-based object failing to be pulled into any of the security-enabled context-based data gravity wells, trapping, by one or more hardware processors, said unmatched parsed security-enabled synthetic context-based object in an unmatched parsed security-enabled synthetic context-based object trap.

2. The processor-implemented method of claim 1, further comprising:
processing, by one or more hardware processors, the unmatched parsed security-enabled synthetic context-based object to generate an alert, wherein the alert indicates that the unmatched parsed security-enabled synthetic context-based object represents a financially fraudulent event.

3. The processor-implemented method of claim 1, further comprising:
graphically displaying, by one or more hardware processors, the multiple security-enabled context-based data gravity wells according to a combined virtual mass of the multiple parsed security-enabled synthetic context-based objects, wherein a first security-enabled context-based data gravity well holds a more virtually massive combination of parsed security-enabled synthetic context-based objects than a second security-enabled context-based data gravity well, and wherein the first security-enabled context-based data gravity well extends farther away from the security-enabled context-based data gravity wells membrane than the second security-enabled context-based data gravity well.

4. The processor-implemented method of claim 1, further comprising:
determining, by one or more hardware processors, a likelihood that a particular security-enabled synthetic context-based object is pulled into an appropriate security-enabled context-based data gravity well according to a Bayesian probability formula of:

$$P(A \mid B) = \frac{P(B \mid A)P(A)}{P(B)}$$

where:
P(A|B) is the probability that a security-enabled synthetic context object will be an appropriate populator of a particular security-enabled context-based data gravity well (A) given that (|) a predefined amount of confirmed context objects are applied to the non-contextual data object in a security-enabled synthetic context-based object (B);
P(B|A) is the probability that the predefined amount of confirmed context-based objects are applied to the non-contextual data object in the security-enabled synthetic context-based object (B) given that (|) the security-enabled synthetic context-based object is assigned to the particular security-enabled context-based data gravity well (A);
P(A) is the probability that the particular security-enabled synthetic context-based object will be the appropriate populator of the particular security-enabled context-based data gravity well regardless of any other information; and
P(B) is the probability that the particular security-enabled synthetic context-based object will have the predefined amount of confirmed context objects regardless of any other information.

5. The processor-implemented method of claim 1, wherein the weighting factor of importance of the security-enabled synthetic context-based object is based on how important the security-enabled synthetic context-based object is to a particular project.

6. The processor-implemented method of claim 1, wherein the correct context object is a context object that defines the specific subject-matter of a particular project.

7. The processor-implemented method of claim 1, further comprising:
graphically representing, by one or more hardware processors, said at least one context object and said at least one security object on a wall of said particular security-enabled context-based data gravity well.

8. The processor-implemented method of claim 1, further comprising:
determining, by one or more hardware processors, an age of each of the multiple parsed security-enabled synthetic context-based objects that have been pulled into the particular security-enabled context-based data gravity well; and
removing, by one or more hardware processors, from the particular security-enabled context-based data gravity well any parsed security-enabled synthetic context-based object that is older than a predetermined age.

9. A computer program product for defining multiple security-enabled context-based data gravity wells on a security-enabled context-based data gravity wells membrane, the computer program product comprising a non-transitory computer readable storage medium having program code embodied therewith, the program code readable and executable by one or more hardware processors to perform a method comprising:
receiving a data stream of non-contextual data objects, wherein each of the non-contextual data objects ambiguously relates to multiple subject-matters;
associating one of the non-contextual data objects with a context object to define a synthetic context-based object, wherein the context object provides a context that identifies a specific subject-matter, from the multiple subject-matters, of said one of the non-contextual data objects;
associating the synthetic context-based object with a security object to generate a security-enabled synthetic context-based object, wherein the security object describes a circumstance that describes an environment in which an event is occurring;
parsing the security-enabled synthetic context-based object into an n-tuple, wherein the n-tuple comprises a pointer to said one of the non-contextual data objects, a probability that a non-contextual data object has been associated with a correct context object, a weighting factor of importance of the security-enabled synthetic context-based object, and a probability that the security object has been associated with a correct synthetic context-based object;
calculating a virtual mass of the parsed security-enabled synthetic context-based object, wherein the virtual mass of the parsed security-enabled synthetic context-based object is derived from a formula of:

(P(C)+P(S))×Wt(S), where P(C) is the probability that the non-contextual data object has been associated with the correct context object, wherein P(S) is the probability that the security object has been associated with the correct synthetic context-based object, and where Wt(S) is the weighting factor of importance of the security-enabled synthetic context-based object;
creating multiple security-enabled context-based data gravity well frameworks on a security-enabled context-based data gravity wells membrane, wherein each of the multiple security-enabled context-based data gravity well frameworks comprises at least one non-contextual data object, at least one context object, and at least one security object, and wherein the security-enabled context-based data gravity wells membrane is a virtual mathematical membrane that is capable of supporting multiple security-enabled context-based data gravity wells;

transmitting multiple parsed security-enabled synthetic context-based objects to the security-enabled context-based data gravity wells membrane;

defining multiple security-enabled context-based data gravity wells according to the virtual mass of multiple parsed security-enabled synthetic context-based objects that are pulled into each of the security-enabled context-based data gravity well frameworks, wherein each of the multiple parsed security-enabled synthetic context-based objects is pulled into a particular security-enabled context-based data gravity well in response to values from its n-tuple matching said at least one non-contextual data object, said at least one context object, and said at least one security object in said particular security-enabled context-based data gravity well; and in response to an unmatched parsed security-enabled synthetic context-based object failing to be pulled into any of the security-enabled context-based data gravity wells, trapping said unmatched parsed security-enabled synthetic context-based object in an unmatched parsed security-enabled synthetic context-based object trap.

10. The computer program product of claim 9, further comprising program code that is readable and executable by said one or more hardware processors to:

process the unmatched parsed security-enabled synthetic context-based object to generate an alert, wherein the alert indicates that the unmatched parsed security-enabled synthetic context-based object represents a financially fraudulent event.

11. The computer program product of claim 9, further comprising program code that is readable and executable by said one or more hardware processors to:

graphically display the multiple security-enabled context-based data gravity wells according to a combined virtual mass of the multiple parsed security-enabled synthetic context-based objects, wherein a first security-enabled context-based data gravity well holds a more virtually massive combination of parsed security-enabled synthetic context-based objects than a second security-enabled context-based data gravity well, and wherein the first security-enabled context-based data gravity well extends farther away from the security-enabled context-based data gravity wells membrane than the second security-enabled context-based data gravity well.

12. The computer program product of claim 9, further comprising program code that is readable and executable by said one or more hardware processors to:

determine a likelihood that a particular security-enabled synthetic context-based object is pulled into an appropriate security-enabled context-based data gravity well according to a Bayesian probability formula of:

$$P(A \mid B) = \frac{P(B \mid A)P(A)}{P(B)}$$

where:

P(A|B) is the probability that a security-enabled synthetic context object will be an appropriate populator of a particular security-enabled context-based data gravity well (A) given that (I) a predefined amount of confirmed context objects are applied to the non-contextual data object in a security-enabled synthetic context-based object (B);

P(B|A) is the probability that the predefined amount of confirmed context-based objects are applied to the non-contextual data object in the security-enabled synthetic context-based object (B) given that (I) the security-enabled synthetic context-based object is assigned to the particular security-enabled context-based data gravity well (A);

P(A) is the probability that the particular security-enabled synthetic context-based object will be the appropriate populator of the particular security-enabled context-based data gravity well regardless of any other information; and P(B) is the probability that the particular security-enabled synthetic context-based object will have the predefined amount of confirmed context objects regardless of any other information.

13. The computer program product of claim 9, wherein the weighting factor of importance of the security-enabled synthetic context-based object is based on how important the security-enabled synthetic context-based object is to a particular project.

14. The computer program product of claim 9, wherein the correct context object is a context object that defines the specific subject-matter of a particular project.

15. The computer program product of claim 9, further comprising program code that is readable and executable by said one or more hardware processors to:

graphically represent said at least one context object and said at least one security object on a wall of said particular security-enabled context-based data gravity well.

16. The computer program product of claim 9, further comprising program code that is readable and executable by said one or more hardware processors to:

determine an age of each of the multiple parsed security-enabled synthetic context-based objects that have been pulled into the particular security-enabled context-based data gravity well; and remove from the particular security-enabled context-based data gravity well any parsed security-enabled synthetic context-based object that is older than a predetermined age.

17. A computer system comprising:

a processor, a computer readable memory, and a computer readable storage medium;

first program instructions to receive a data stream of non-contextual data objects, wherein each of the non-contextual data objects ambiguously relates to multiple subject-matters;

second program instructions to associate one of the non-contextual data objects with a context object to define a synthetic context-based object, wherein the context object provides a context that identifies a specific subject-matter, from the multiple subject-matters, of said one of the non-contextual data objects;

third program instructions to associate the synthetic context-based object with a security object to generate a security-enabled synthetic context-based object, wherein the security object describes a circumstance that describes an environment in which an event is occurring;

fourth program instructions to parse the security-enabled synthetic context-based object into an n-tuple, wherein the n-tuple comprises a pointer to said one of the non-contextual data objects, a probability that a non-contextual data object has been associated with a correct context object, a weighting factor of importance of the security-enabled synthetic context-based object, and a probability that the security object has been associated with a correct synthetic context-based object;

fifth program instructions to calculate a virtual mass of the parsed security-enabled synthetic context-based object, wherein the virtual mass of the parsed security-enabled synthetic context-based object is derived from a formula of:

$$(P(C)+P(S))\times Wt(S),$$

where P(C) is the probability that the non-contextual data object has been associated with the correct context object, wherein P(S) is the probability that the security object has been associated with the correct synthetic context-based object, and where Wt(S) is the weighting factor of importance of the security-enabled synthetic context-based object;

sixth program instructions to create multiple security-enabled context-based data gravity well frameworks on a security-enabled context-based data gravity wells membrane, wherein each of the multiple security-enabled context-based data gravity well frameworks comprises at least one non-contextual data object, at least one context object, and at least one security object, and wherein the security-enabled context-based data gravity wells membrane is a virtual mathematical membrane that is capable of supporting multiple security-enabled context-based data gravity wells;

seventh program instructions to transmit multiple parsed security-enabled synthetic context-based objects to the security-enabled context-based data gravity wells membrane;

eighth program instructions to define multiple security-enabled context-based data gravity wells according to the virtual mass of multiple parsed security-enabled synthetic context-based objects that are pulled into each of the security-enabled context-based data gravity well frameworks, wherein each of the multiple parsed security-enabled synthetic context-based objects is pulled into a particular security-enabled context-based data gravity well in response to values from its n-tuple matching said at least one non-contextual data object, said at least one context object, and said at least one security object in said particular security-enabled context-based data gravity well; and ninth program instructions to, in response to an unmatched parsed security-enabled synthetic context-based object failing to be pulled into any of the security-enabled context-based data gravity wells, trap said unmatched parsed security-enabled synthetic context-based object in an unmatched parsed security-enabled synthetic context-based object trap; and wherein the first, second, third, fourth, fifth, sixth, seventh, eighth, and ninth program instructions are stored on the computer readable storage medium for execution by the processor via the computer readable memory.

18. The computer system of claim 16, further comprising:
tenth program instructions to process the unmatched parsed security-enabled synthetic context-based object to generate an alert, wherein the alert indicates that the unmatched parsed security-enabled synthetic context-based object represents a financially fraudulent event; and wherein the tenth program instructions are stored on the computer readable storage medium for execution by the processor via the computer readable memory.

19. The computer system of claim 16, further comprising:
tenth program instructions to graphically display the multiple security-enabled context-based data gravity wells according to a combined virtual mass of the multiple parsed security-enabled synthetic context-based objects, wherein a first security-enabled context-based data gravity well holds a more virtually massive combination of parsed security-enabled synthetic context-based objects than a second security-enabled context-based data gravity well, and wherein the first security-enabled context-based data gravity well extends farther away from the security-enabled context-based data gravity wells membrane than the second security-enabled context-based data gravity well; and wherein the tenth program instructions are stored on the computer readable storage medium for execution by the processor via the computer readable memory.

20. The computer system of claim 16, further comprising:
tenth program instructions to determine a likelihood that a particular security-enabled synthetic context-based object is pulled into an appropriate security-enabled context-based data gravity well according to a Bayesian probability formula of:

$$P(A\mid B) = \frac{P(B\mid A)P(A)}{P(B)}$$

where:
P(A|B) is the probability that a security-enabled synthetic context object will be an appropriate populator of a particular security-enabled context-based data gravity well (A) given that (|) a predefined amount of confirmed context objects are applied to the non-contextual data object in a security-enabled synthetic context-based object (B);

P(B|A) is the probability that the predefined amount of confirmed context-based objects are applied to the non-contextual data object in the security-enabled synthetic context-based object (B) given that (|) the security-enabled synthetic context-based object is assigned to the particular security-enabled context-based data gravity well (A);

P(A) is the probability that the particular security-enabled synthetic context-based object will be the appropriate populator of the particular security-enabled context-based data gravity well regardless of any other information; and P(B) is the probability that the particular security-enabled synthetic context-based object will have the predefined amount of confirmed context objects regardless of any other information; and wherein the tenth program instructions are stored on the computer readable storage medium for execution by the processor via the computer readable memory.

* * * * *